(12) United States Patent
Zhou (10) Patent No.: US 11,384,481 B2
(45) Date of Patent: Jul. 12, 2022

(54) CALENDER, AND FLOOR PRODUCTION LINE AND PRODUCTION METHOD

(71) Applicant: QINGDAO SANYI PLASTIC MACHINERY CO., LTD., Qingdao (CN)

(72) Inventor: Yuliang Zhou, Qingdao (CN)

(73) Assignee: QINGDAO SANYI PLASTIC MACHINERY CO., LTD., Qingdao (CN)

( * ) Notice: Subject to any disclaimer, the term of this patent is extended or adjusted under 35 U.S.C. 154(b) by 165 days.

(21) Appl. No.: 16/783,150

(22) Filed: Feb. 5, 2020

(65) Prior Publication Data
US 2020/0173108 A1 Jun. 4, 2020

Related U.S. Application Data

(63) Continuation of application No. PCT/CN2018/090040, filed on Jun. 6, 2018.

(30) Foreign Application Priority Data

| Oct. 13, 2017 | (CN) | 201710950987.7 |
| Oct. 13, 2017 | (CN) | 201710950992.8 |
| Oct. 13, 2017 | (CN) | 201710951001.8 |
| Oct. 13, 2017 | (CN) | 201721316788.2 |
| Oct. 13, 2017 | (CN) | 201721317244.8 |
| Oct. 13, 2017 | (CN) | 201721317296.5 |

(51) Int. Cl.
*D21G 1/02* (2006.01)
*B32B 37/06* (2006.01)
(Continued)

(52) U.S. Cl.
CPC ............... *D21G 1/02* (2013.01); *B32B 37/06* (2013.01); *B32B 37/10* (2013.01); *D21G 1/0086* (2013.01)

(58) Field of Classification Search
CPC ...... D21G 1/02; D21G 1/0086; D21G 1/0253; D21G 1/0293; B32B 37/06; B32B 37/10;
(Continued)

(56) References Cited

U.S. PATENT DOCUMENTS

| 2007/0077415 A1 | 4/2007 | Sinsel et al. |
| 2017/0165881 A1 | 6/2017 | Shinobudani |
| 2018/0163413 A1* | 6/2018 | Odum ..................... B29C 43/24 |

FOREIGN PATENT DOCUMENTS

| CN | 103692759 A | 4/2014 |
| CN | 205553494 U | 9/2016 |

(Continued)

OTHER PUBLICATIONS

JPH1190949A Machine Translation of Description (EPO/Google) (Year: 2021).*
(Continued)

*Primary Examiner* — Cynthia L Schaller
(74) *Attorney, Agent, or Firm* — J.C. Patents (57) ABSTRACT

The present application provides a calender, a floor production line and a production method using the calender, wherein the calender comprises a calendering roller rack and a set of calendering rollers arranged on the calendering roller rack. The set of calendering rollers comprises a plurality of calendering rollers arranged in a line and not vertically. The present application changes the arrangement of the calendering rollers. The calendering rollers are arranged in a line, not vertically. This arrangement reduces the overall height of the calender, decreases the requirements of the calender on the height of the factory building and facilitates long-distance transportation by containers. Using the calender to assemble the floor production line, the height space of the factory building occupied by the production line can be saved.

16 Claims, 8 Drawing Sheets

(51) Int. Cl.
*B32B 37/10* (2006.01)
*D21G 1/00* (2006.01)

(58) Field of Classification Search
CPC ..... B32B 37/0053; B32B 38/18; B32B 41/00; B32B 37/15; B32B 37/156; B32B 38/06; B32B 37/08; B29C 48/0021; B29C 48/0022; B29C 48/07; B29C 33/026; B29C 43/222; B29C 43/305; B29C 48/0011; B29C 59/046; B29C 43/52; B29C 2043/467; B29C 43/46; B29C 43/24; B29C 48/914; B29K 2027/06; B29K 2105/04; B29K 2311/14; B29K 2995/0087; B29L 2007/00; B29L 2031/732; B29L 2009/00
See application file for complete search history.

(56) References Cited

FOREIGN PATENT DOCUMENTS

| | | | |
|---|---|---|---|
| CN | 106985489 | A | 7/2017 |
| CN | 107042679 | A | 8/2017 |
| CN | 107127948 | A * | 9/2017 |
| CN | 107186937 | A | 9/2017 |
| CN | 107200967 | A | 9/2017 |
| CN | 107487060 | A | 12/2017 |
| CN | 107571591 | A | 1/2018 |
| CN | 107650482 | A | 2/2018 |
| CN | 207373873 | U | 5/2018 |
| CN | 207373876 | U | 5/2018 |
| JP | H1190949 | A * | 4/1999 |
| WO | WO2017004613 | A1 | 1/2017 |

OTHER PUBLICATIONS

CN107042679A Machine Translation (EPO/Google) of Description published Aug. 15, 2017) (Year: 2021).*
CN107127948A Machine Translation of Description (EPO/Google) (Year: 2021).*
The International Search Report of corresponding International application No. PCT/CN2018/090040, dated Aug. 17, 2018.
The Chinese Search Report of corresponding Chinese application No. 201710950992.8, dated Jan. 22, 2019.

* cited by examiner

CALENDER, AND FLOOR PRODUCTION LINE AND PRODUCTION METHOD

CROSS-REFERENCE TO RELATED APPLICATION

The present application is a continuation application of International Application No. PCT/CN2018/090040 filed on Jun. 6, 2018, which claims priority to Chinese Patent Application No. 201721317296.5 filed on Oct. 13, 2017, Chinese Patent Application No. 201710950987.7 filed on Oct. 13, 2017, Chinese Patent Application No. 201721317244.8 filed on Oct. 13, 2017, Chinese Patent Application No. 201710951001.8 filed on Oct. 13, 2017, Chinese Patent Application No. 201721316788.2 filed on Oct. 13, 2017, and Chinese Patent Application No. 201710950992.8 filed on Oct. 13, 2017. The disclosures of the aforementioned applications are hereby incorporated by reference in their entirety.

TECHNICAL FIELD

The present application relates to the technical field of sheet processing machinery, and in particular to a calender, a floor production line and a production method.

BACKGROUND OF THE PRESENT INVENTION

A calender, as sheet processing machinery, usually includes a set of calendering rollers. The set of calendering rollers consists of a plurality of calendering rollers spaced apart from each other, and the number of calendering rollers varies depending on different processing requirements.

The arrangement of the calendering rollers determines the space occupation of the calender. In the prior art, the calendering rollers are generally vertically arranged. For example, Chinese Utility Patent No. CN205553494U disclosed a production device for film-laminating, calendaring and compounding of PVC stone-plastic bottom plate. The set of calendering rollers includes a lower mirror-surface roller, an upper mirror-surface roller, a bottom pattern roller, and an embossing roll, all of which are vertically arranged, and a blank to be machined passes through the calendering rollers. This structure has the following disadvantages. (1) The vertical arrangement leads to a too high vertical height of the set of calendering rollers and thus increases the vertical space occupation of the set of calendering rollers. As a result, the overall height of the calender is too high. Thus, a factory building with a corresponding height is required and it is not convenient to transport the calender by containers. (2) The embossing roller on the top is the most frequently replaced calendering roller, and during the replacement of the calendering rollers, it needs to be hoisted by a crane. The vertical arrangement and the hoisting height of the crane propose higher requirements on the height of the factory building.

SUMMARY OF THE PRESENT INVENTION

In view of the aforementioned problems, the present application provides a calender and also provides a floor production line and a production method using the calender.

For this purpose, in one aspect, the present application provides a calender, comprising a calendering roller rack and a set of calendering rollers arranged on the calendering roller rack, the set of calendering rollers comprises a plurality of calendering rollers arranged in a line and not vertically.

Preferably, the plurality of calendering rollers are arranged transversely in a horizontal direction.

Preferably, walking wheels are arranged on a bottom of the calendering roller rack to make the calendering roller rack capable of walking on a ground track.

Preferably, the calender further comprises a front-end cooling device, and a blank enters a feed end of the set of calendering rollers from a discharge end of the front-end cooling device to realize cooling of the blank.

Preferably, the front-end cooling device comprises at least one set of cooling rollers and/or at least one set of cooling plates; the set of cooling rollers comprises two cooling rollers spaced apart from each other for sandwiching the blank therebetween; and the set of cooling plates comprises two cooling plates spaced apart from each other for sandwiching the blank therebetween.

Preferably, the set of cooling rollers and/or the set of cooling plates are arranged in a line with the set of calendering rollers along a horizontal direction of the ground.

Preferably, the calender further comprises a film laminating assembly and a film laminating assembly rack for mounting the film laminating assembly.

Preferably, the calendering roller rack and the film laminating assembly rack are arranged in relative motion to each other, and the calendering roller rack is capable of moving relatively to the ground.

Preferably, walking wheels are arranged on a bottom of the calendering roller rack to make the calendering roller rack capable of walking on a ground track.

Preferably, the film laminating assembly rack is fixedly mounted on the ground.

Preferably, the film laminating assembly comprises a first film laminating assembly and a second film laminating assembly, and a first film from the first film laminating assembly and a second film from the second film laminating assembly are guided to different calendering rollers, respectively, to laminate the first film and the second film onto a blank.

Preferably, the set of calendering rollers at least comprises four calendering rollers, the first film is guided to a first calendering roller of the set of calendering rollers, and the second film is guided to a calendering roller spaced apart from the first calendering roller.

Preferably, a bearing seat mounting rail is arranged on the calendering roller rack, the bearing seat mounting rail is directed from a calendering roller at a discharge end of the set of calendering rollers towards an adjacent calendering roller to the calendering roller at the discharge end; the calendering roller at the discharge end is mounted on the bearing seat mounting rail by a bearing seat in order to adjust a distance between the calendering roller at the discharge end and the adjacent calendering roller.

In another aspect, the present application provides a floor production line comprising the calender described in any one of the above items.

In still another aspect, the present application provides a method for producing a floor by the calender described in any one of the above items: mixing materials and melting, and then extruding a blank, performing film laminating process to the extruded blank and then cooling and cutting; wherein the film laminating process comprises the following steps:

performing a first-stage heating and compacting process to the blank, and laminating a first film onto a surface of a side of the extruded blank during the first heating heating and compacting stage;

performing at least one second-stage heating and compacting process to the blank after processed by the first-stage heating and compacting process; and performing a third-stage heating and compacting process to the blank after processed by the second-stage heating and compacting process, and laminating a second film onto a surface of the first film during the third-stage heating and compacting process.

Preferably, a temperature for the second-stage heating and compacting process is higher than a temperature for the first-stage heating and compacting process, and a temperature for the third-stage heating and compacting process is higher than a temperature for the second-stage heating and compacting process.

Preferably, the temperature for the first-stage heating and compacting process is 60° C. to 130° C., the temperature for the second-stage heating and compacting process is 90° C. to 150° C., the temperature for the third-stage heating and compacting process is 120° C. to 180° C.

Preferably, cooling and shaping the blank before the film laminating process; the cooling and shaping process is staged cooling and shaping and comprises at least a first cooling stage and a second cooling stage after the blank is extruded and before the first-stage heating and compacting process.

Preferably, a temperature for the first cooling stage is not higher than a temperature for the second cooling stage.

Preferably, the temperature for the first cooling stage is 20° C. to 60° C. and the temperature for the second cooling stage is 30° C. to 80° C.

The present application has the following beneficial effects:

(1) In the calender of the present application, the arrangement of the calendering rollers is changed. The calendering rollers are arranged in a line, not vertically. This arrangement reduces the overall height of the calender, decreases the requirements of the calender on the height of the factory building and facilitates long-distance transportation by containers. Using the calender to assemble the floor production line, the height space of the factory building occupied by the production line can be saved.

(2) In the production method of the present application, by designing a stepwise heating, compacting and shaping process, the film lamination effect is enhanced, and the blank can be foamed better. Thus, the obtained foamed floor is good in quality and low in cost.

BRIEF DESCRIPTION OF THE DRAWINGS

FIG. 9 is a top view of a floor production line in Embodiment 5, in which:

1: calendering roller rack; 101: walking wheel; 102: driving motor; 103: walking track; 104: bearing seat mounting rail; 105: bearing seat; 106: third gap adjustment device; 2: set of calendering rollers; 201: calendering roller at a feed end; 202: second calendering roller; 203: third calendering roller; 204: calendering roller at a discharge end; 211: set of cooling plates; 2111: first gap adjustment device; 212: set of cooling rollers; 2121: second gap adjustment device; 3: film laminating assembly rack; 301: fixing column; 302: operating platform; 303: stair; 4: printing film; 401: first printing film winding and unwinding wheel; 402: first guide wheel; 403: second printing film winding and unwinding wheel; 411: first preliminary guide wheel; 412: first extended guide wheel set; 413: first flattening roller; 414: first guide rack; 5: wear-resistant film; 501: first wear-resistant film winding and unwinding wheel; 502: second guide wheel; 503 second wear-resistant film winding and unwinding wheel; 511: second preliminary guide wheel; 512: second extended guide wheel set; 513: second flattening roller; 514: second guide rack; 6: first auxiliary laminating roller; 7: second auxiliary laminating roller; 11: calender; 12: feeder; 13: extruder; 14: mold; 15: cooling bracket; 16: tractor; 17: cutter; 18: conveying bracket; and 19: plate lifter.

DETAILED DESCRIPTION OF THE PRESENT INVENTION

The specific implementations of the present application will be described clearly and completely below with reference to the accompanying drawings. Apparently, embodiments to be described in the specific implementations are only some but not all of the embodiments of the present application. Based on the embodiments of the present application, all other embodiments obtained by a person of ordinary skill in the art without paying any creative effort shall fall into the protection scope of the present application.

In the description of the present application, it is to be noted that the positional relationship of the calender is based on the positional relationship shown in the drawings, merely for describing the present application conveniently and simplifying the description, and is not intended to indicate or imply that the stated device or element must have a particular orientation or must be constructed and operated in a particular orientation, and thus is not to be construed as any limitation to the present application. In addition, terms "first", "second" and "third" are used only for the purpose of description, and are not intended to indicate or imply relative importance.

Embodiment 1

This embodiment provides a calender with less height space occupation.

The calender comprises a calendering roller rack 1 and a set of calendering rollers 2 arranged on the calendering roller rack 1. The set of calendering rollers 2 comprises a plurality of calendering rollers arranged in a line and not vertically. The vertical arrangement of calendering rollers in the traditional calender has great height space occupation, resulting in high requirements on the height of the factory building. Once the overall height of the calender exceeds the height of containers, it is impossible to transport the calender, in a whole, by containers. Given the same number of calendering rollers, the non-vertical arrangement of calendering rollers can reduce the height space occupation of the whole calender.

Figure 1:
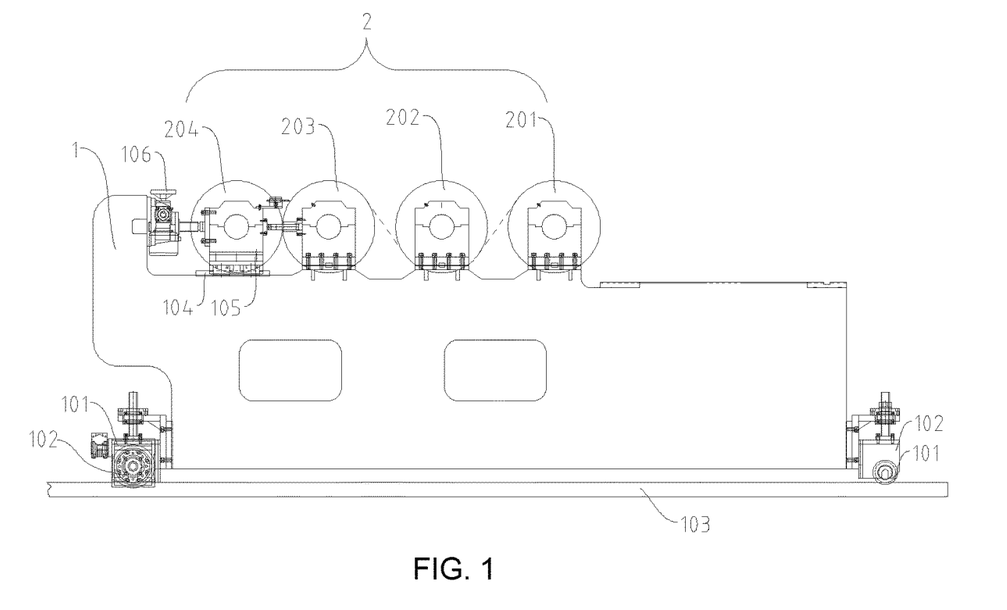
FIG. 1 is a schematic structure diagram of a calender in an embodiment.

As shown in FIG. 1, given the same number of calendering rollers, to minimize the vertical height space occupation of the calender, the plurality of calendering rollers are arranged transversely in a horizontal direction. In this embodiment, the set of calendering rollers 2 has total four calendering rollers, i.e., in a processing direction, a calendering roller at a feed end 201, a second calendering roller 202, a third calendering roller 203 and a calendering roller at a discharge end 204, wherein the calendering roller at the discharge end 204 is an embossing roller. During the production, the embossing roller is replaced according to embossing requirements.

Preferably, walking wheels 101 are arranged on a bottom of the calendering roller rack 1 so that the calendering roller rack 1 can walk on a ground track.

Preferably, the calender further comprises a front-end cooling device, and a blank enters a feed end of the set of calendering rollers 2 from a discharge end of the front-end cooling device. Here, the feed end of the set of calendering rollers 2 refers to an initial feed end of the set of calendering rollers 2, i. e., a front end of the calendering roller at the feed end 201. The calender is a high-temperature processing apparatus. By controlling the temperatures of the calendering rollers, the blank is high-temperature shaped during its passage through the calendering rollers. According to the properties of the blank, cooling and shaping the blank before it enters the calender can provide for better shaping effect.

Figure 2:
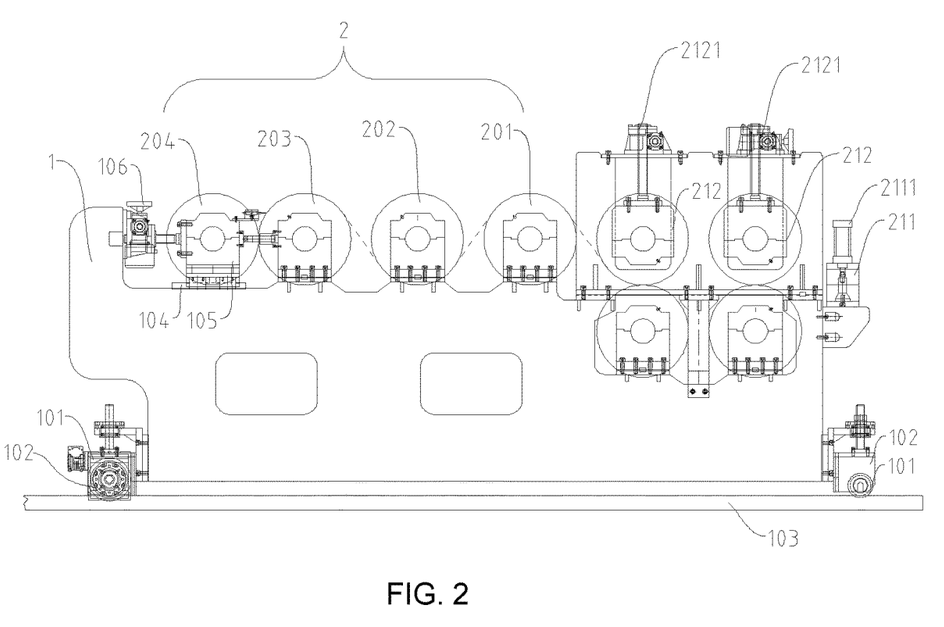
FIG. 2 is a schematic structure diagram of a calender having a front-end cooling device, in the embodiment.

As shown in FIG. 2, the front-end cooling device comprises at least one set of cooling rollers 212 and/or at least one set of cooling plates 211; the set of cooling rollers 212 comprises two cooling rollers spaced apart from each other; and the set of cooling plates 211 comprises two cooling plates spaced apart from each other. Cooling pipelines are arranged in both the set of cooling rollers 212 and the set of cooling plates 211. Circulating cooling water is fed into the cooling pipelines. The blank is cooled and shaped during its passage through a gap between the set of cooling rollers 212 and a gap between the set of cooling plates 211.

To save the overall height space occupation of the calender, the set of cooling rollers 212 and/or the set of cooling plates 211 are arranged in a line with the set of calendering rollers 2. For example, in this embodiment, the front-end cooling device comprises one set of cooling plates 211 and two sets of cooling rollers 212. The blank is first passed through the set of cooling plates 211, and then through the sets of cooling rollers 212. Both the two sets of cooling rollers 212 and the one set of cooling plates 211 are arranged in a line with the set of calendering rollers 2. The cooling plate, on the top, of the set of cooling plates 211 is connected to a first gap adjustment device 2111 configured to adjust the gap between the two cooling plates. The cooling roller, on the top, of the set of cooling rollers 212 is connected to a second gap adjustment device 2121 configured to adjust the gap between the two cooling rollers. The first gap adjustment device and the second gap adjustment device may be electrical gap adjustment devices. The electrical gap adjustment device comprises a worm gear and a worm, which are fitted by threads. The worm gear is driven by a motor to rotate. The rotation of the worm gear drives the worm to do linear reciprocating motion. The worm is connected to a bearing seat for the cooling plate or the cooling roller, thereby driving the cooling plate or cooling roller to move up and down, thus realizing the gap adjustment. It may be understood that the gap adjustment device may be other devices that can realize gap adjustment.

Embodiment 2

Figure 3:
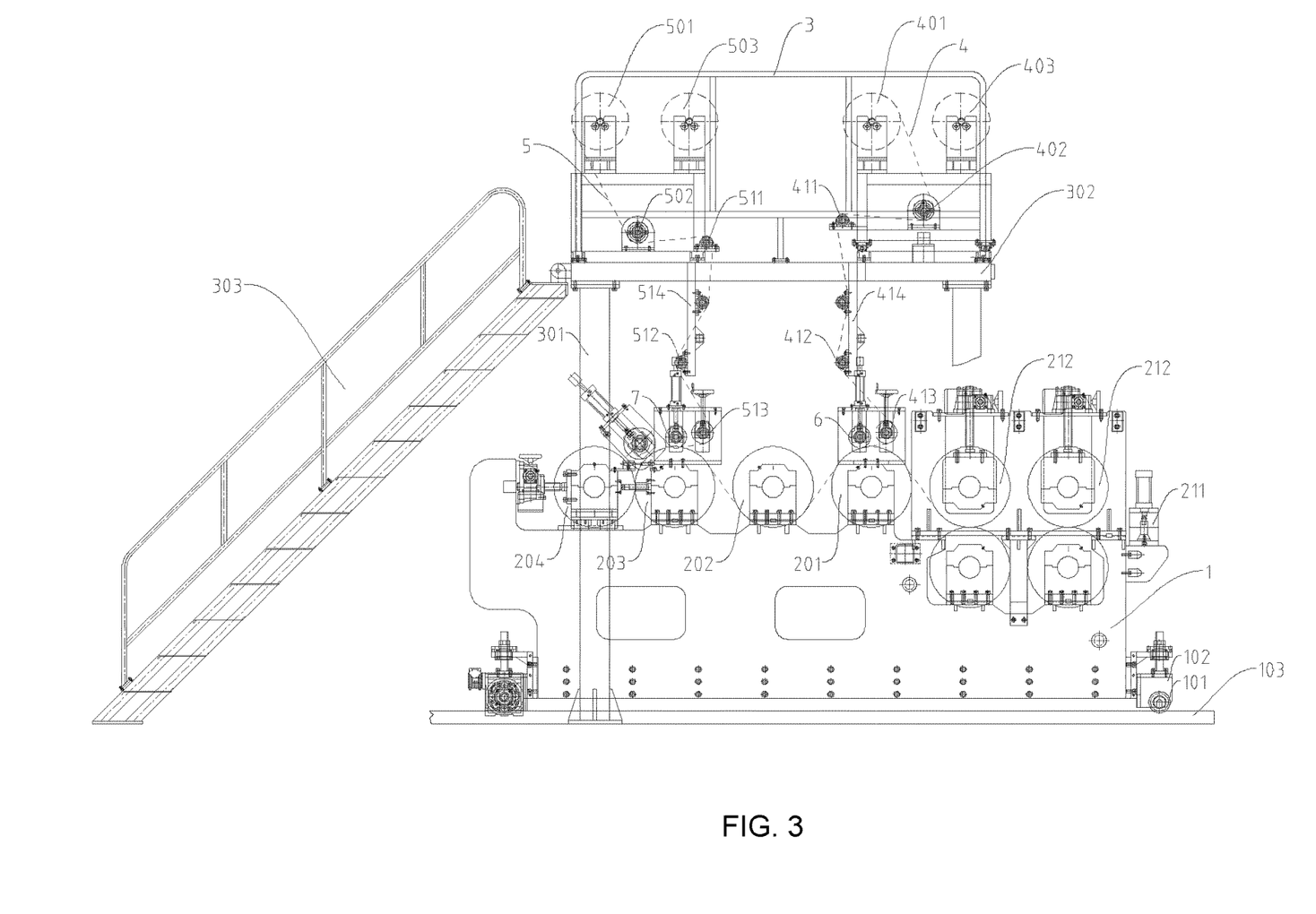
FIG. 3 is a schematic structure diagram of the calender in the embodiment.
Figure 5:
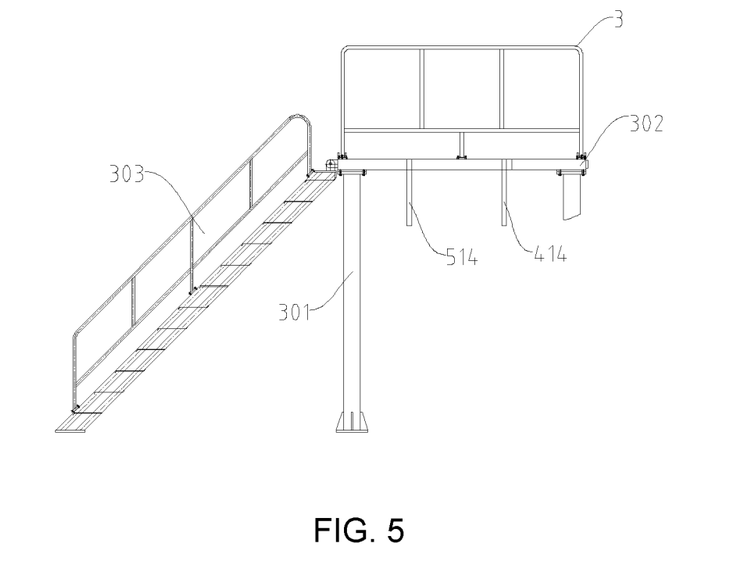
FIG. 5 is a schematic structure diagram of a film laminating assembly rack in the embodiment.
Figure 6:
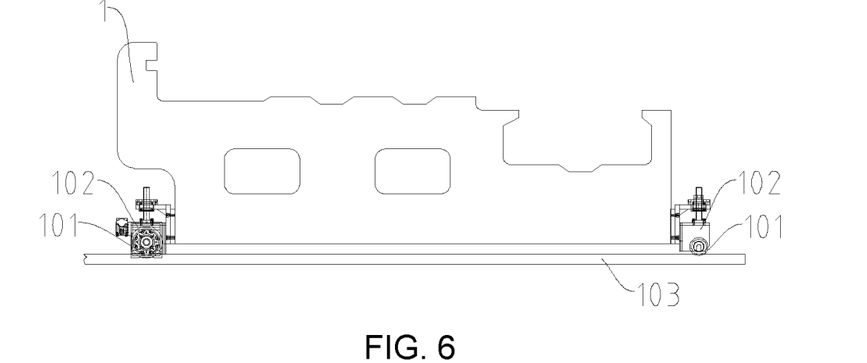
FIG. 6 is a schematic structure diagram of a calendering roller rack in the embodiment.

On the basis of Embodiment 1, to process a blank with film laminating requirement, as shown in FIG. 3, the calender further comprises a film laminating assembly that is mounted on a film laminating assembly rack 3, wherein the film laminating assembly is configured to provide a film to the set of calendering rollers 2 in order to laminate the film onto a surface of the blank. The film laminating assembly rack 3 (as shown in FIG. 5) and the calendering roller rack 1 (as shown in FIG. 6) are integrated, or separated. In this embodiment, the calendering roller rack 1 and the film laminating assembly rack 3 are arranged in relative motion to each other, and the calendering roller rack 1 can move relatively to the ground.

The film laminating assembly rack 3 may or may not be fixed on the ground. Preferably, to ensure the stability of the film laminating assembly rack 3, in this embodiment, the film laminating assembly rack 3 is fixed on the ground by a fixing column 301.

As shown in FIG. 3 and FIG. 5, the film laminating assembly rack 3 comprises an operating platform 302 on which the film laminating assembly is arranged. To reduce the space occupation, the operating platform 302 is arranged, with a space left between the operating platform 302 and the ground. During the normal operation, the calendering roller rack 1 is located in the space between the operating platform 302 and the ground, below the film laminating assembly rack 3, to shorten film laminating route. Preferably, a stair 303 is arranged between the operating platform 302 and the ground, by which a person can go to the operating platform 302 to maintain the film laminating assembly.

When in use, the set of calendering rollers 2 will be shielded by the film laminating assembly and the film laminating assembly rack 3 in a vertical direction. In such a structure, it is inconvenient to replace a calendering roller directly. When a calendering roller needs to be replaced, it is necessary to ensure that the calender has been stopped. Then, the calendering roller rack 1 is moved so that transverse relative displacement occurs between the calendering roller rack 1 and the film laminating assembly rack 3. The set of calendering rollers 2 is driven by the calendering roller rack 1 to come out from under the film laminating assembly rack 3, so that the set of calendering rollers 2 is not shielded. The calendering roller can be detached and replaced.

Figure 7:
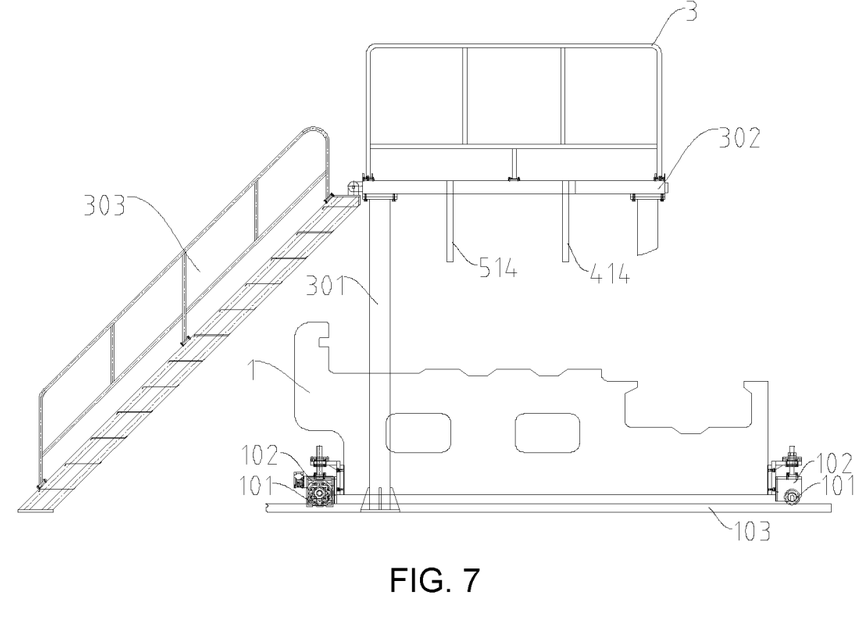
FIG. 7 is a schematic structure diagram of coordination of the film laminating assembly rack and the calendering roller rack in the embodiment.

To move the calendering roller rack 1 more conveniently, as shown in FIG. 6 and FIG. 7, a walking track 103 is arranged on the ground, which is fitted with the walking wheels 101. The walking wheels 101 are located in the walking track 103 and can walk along the walking track 103. The walking wheels 101 are connected to a driving motor 102 and driven by the driving motor 102 to walk. With such a design, the movement of the calendering roller rack 1 becomes easier.

When the calendering roller at the discharge end 204 is an embossing roller, since the embossing roller is the most frequently replaced calendering roller in the set of calendering rollers, by arranging the embossing roller at an end of the calendering roller rack 1, the replacement of the embossing roller can be realized just by moving the embossing roller to an outer side of the film laminating assembly rack 3, without moving the calendering roller rack 1 greatly. Compared with the vertical arrangement structure, the transverse arrangement structure can further reduce the overall height of the calender and thus decrease the requirements on the height of the factory building.

Embodiment 3

On the basis of Embodiment 2, referring to FIG. 3, the routes of the blank and the film laminating are shown by dotted lines. When it is needed to laminate two films onto the blank, the film laminating assembly comprises a first film laminating assembly and a second film laminating assembly, which are configured to guide different films, respectively. A first film from the first film laminating assembly and a second film from the second film laminating assembly are guided to different calendering rollers, respectively, to laminate the first film and the second film onto the blank.

Specifically, in this embodiment, the first film is guided to the first calendering roller of the set of calendering rollers 2, i.e., the calendering roller at the feed end 201, and the second film is guided to a calendering roller spaced apart from the first calendering roller, i. e., the third calendering roller 203.

Preferably, a calendering roller, i. e., the second calendering roller 202, is further arranged between the calendering roller to which the first film is guided and the calendering roller to which the second film is guided.

In this embodiment, the first film laminating assembly is a printing film assembly configured to guide a printing film 4 (equivalently, the first film); and the second film laminating assembly is a wear-resistant film assembly configured to guide a wear-resistant film 5 (equivalently, the second film). The printing film assembly and the wear-resistant film assembly are arranged on the operating platform 302 side by side.

Figure 4:
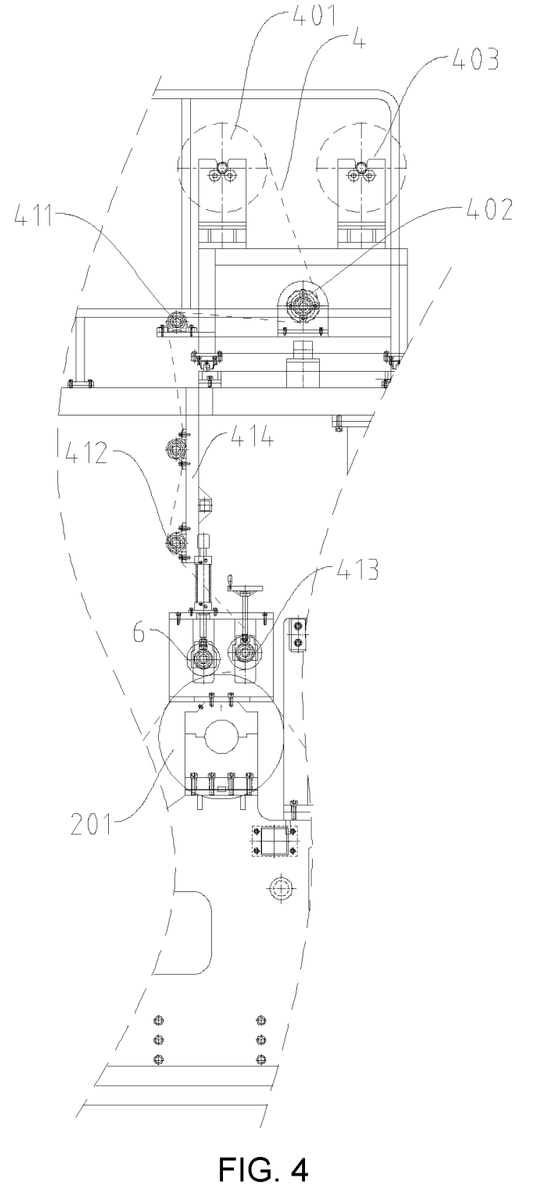
FIG. 4 is a partially enlarged view of FIG. 3.

FIG. 4 is a partially enlarged view of a portion from the printing film assembly to the calendering roller at the feed end 201 of FIG. 3. As shown in FIG. 3 and FIG. 4, the printing film assembly comprises a first printing film winding and unwinding wheel 401 and a first guide wheel 402 arranged on a side of the first printing film winding and unwinding wheel 401. The first guide wheel 402 is configured to guide the printing film unwound by the winding and unwinding wheel to the calendering roller. Preferably, a second printing film winding and unwinding wheel 403 is arranged side by side with the first printing film winding and unwinding wheel 401. The second printing film winding and unwinding wheel 403 is supplementary to the first printing film winding and unwinding wheel 401. When the printing film on the first printing film winding and unwinding wheel 401 is used up, a front end of the printing film on the second printing film winding and unwinding wheel 403 is connected to a tail end of the printing film on the first printing film winding and unwinding wheel 401, thereby continuing the guide and lamination of the printing film 4. This saves the replacement time and improves the efficiency.

The wear-resistant film assembly is the same as the printing film assembly in structure. As shown in FIG. 3, the wear-resistant film assembly specifically comprises a first wear-resistant film winding and unwinding wheel 501 and a second guide wheel 502 arranged on a side of the first wear-resistant film winding and unwinding wheel 501. The second guide wheel 502 is configured to guide the wear-resistant film unwound by the winding and unwinding wheel to the calendering roller. Preferably, a second wear-resistant film winding and unwinding wheel 503 is arranged side by side with the first wear-resistant film winding and unwinding wheel 501. The second wear-resistant film winding and unwinding wheel 503 is supplementary to the first wear-resistant film winding and unwinding wheel 501.

In the prior art, the printing film and the wear-resistant film are guided to a same calendering roller of the set of calendering rollers. The two films are laminated onto the blank by just one process at a same time. The film-laminated floor is not subject to heating and rolling for laminating. As a result, the films are not tightly laminated onto the floor, leading to high defective rate. In this embodiment, as shown in FIG. 3, the printing film 4 and the wear-resistant film 5 are guided to different calendering rollers. Therefore, the printing film 4 and the wear-resistant film 5 can be laminated onto the blank, respectively. Specifically, in this embodiment, the printing film 4 is guided to the calendering roller at the feed end 201, and the wear-resistant film 5 is guided to the third calendering roller 203. The second calendering roller 202 is further arranged between the calendering roller at the feed end 201 and the third calendering roller 203. After laminating the printing film 4 onto the blank, the blank is passed through the gap between the calendering roller at the feed end 201 and the second calendering roller 202 to further heat the printing film 4, and the wear-resistant film 5 is laminated onto the printing film 4 after the blank reaches the third calendering roller 203. The heated printing film 4 has better viscosity and the wear-resistant film 5 can be better laminated onto the printing film 4, resulting in good lamination effect.

To guide the printing film 4 and the wear-resistant film 5 to different calendering rollers, guide mechanisms for them are further designed. That is, the printing film 4 is guided to the calendering roller at the feed end 201 via a first guide mechanism, and the wear-resistant film 5 is guided to the third calendering roller 203 via a second guide mechanism.

As shown in FIG. 3 and FIG. 4, the first guide mechanism comprises a first preliminary guide wheel 411 arranged on the operating platform 201, and the printing film 4 is guided to the calendering roller at the feed end 201 via the first preliminary guide wheel 411. To realize better guide effect, along the exported direction of the printing film 4, the first guide mechanism further comprises a first extended guide wheel set 412 arranged at a rear end of the first preliminary guide wheel 411. The first extended guide wheel set 412 at least comprises one guide wheel. To flatten the printing film 4 before laminating it onto the blank, the first guide mechanism further comprises a first flattening roller 413 arranged at a rear end of the first extended guide wheel set 412. The printing film 4 is flattened by the first flattening roller 413 and then passed to the calendering roller at the feed end 201 where it is laminated onto the blank. To mount the first extended guide wheel set 412, a first guide rack 414 is further provided. The first guide rack 414 is arranged to extend toward the set of calendering rollers 2 from the operating platform 302.

As shown in FIG. 3, the second guide mechanism is the same as the first guide mechanism in structure. The second guide mechanism comprises a second preliminary guide wheel 511 arranged on the operating platform 302. Furthermore, along the exported direction of the wear-resistant film 5, a second extended guide wheel set 512 and a second flattening roller 513 are arranged at a rear end of the second preliminary guide wheel 511. And, a second guide rack 514 is further provided, on which the second extended guide wheel set 512 is mounted. The specific structure of the second guide mechanism is the same as that of the first guide mechanism and will not be repeated here.

When in use, the blank is passed through the calendering rollers; and the printing film 4 and the wear-resistant film 5 are guided to different calendering rollers via the first guide mechanism and the second guide mechanism, and then respectively laminated onto the blank via a first auxiliary laminating roller 6 and a second auxiliary laminating roller 7. After laminating the printing film 4 onto the blank, the blank is heated and pressed by the second calendering roller 202 so that the printing film 4 can be more tightly laminated onto the blank, and after then, the wear-resistant film 5 is laminated. In this way, the quality of lamination is ensured.

Embodiment 4

Depending upon different blank thickness, to ensure the embossed effect, it is necessary to adjust the distance between the calendering roller at the discharge end 204 (embossing roller) and the third calendering roller 203. Therefore, on the basis of the above embodiments, as shown in FIG. 1 and FIG. 2, further, a bearing seat mounting rail 104 is arranged on the calendering roller rack 1. The bearing seat mounting rail 104 is directed from the calender roller at the discharge end 204 towards the adjacent third calendering roller 203. The calendering roller at the discharge end 204 is mounted on the bearing seat mounting rail 104 by a bearing seat 105 in order to adjust the distance between the calendering roller at the discharge end 204 and the adjacent third calendering roller 203. A third gap adjustment device 106 is mounted in the bearing seat 105 to drive the bearing seat 105 to move, in order to adjust the distance. The third gap adjustment device 106 may be the electrical gap adjustment device described above.

Embodiment 5

Figure 8:
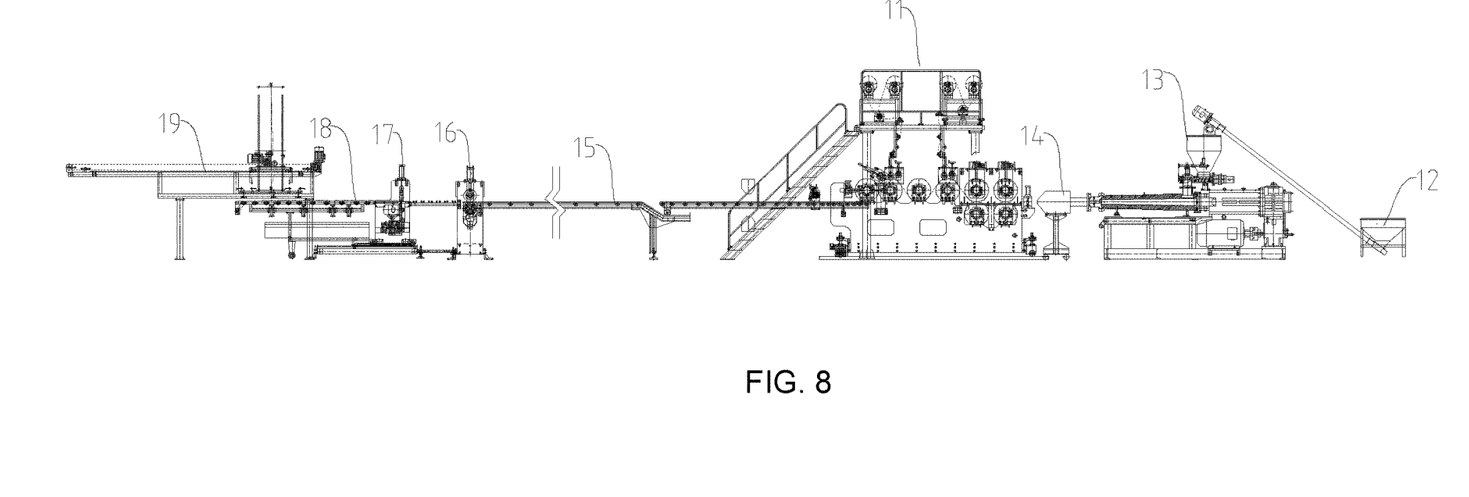
FIG. 8 is a schematic structure diagram of a floor production line in Embodiment 5.
Figure 9:
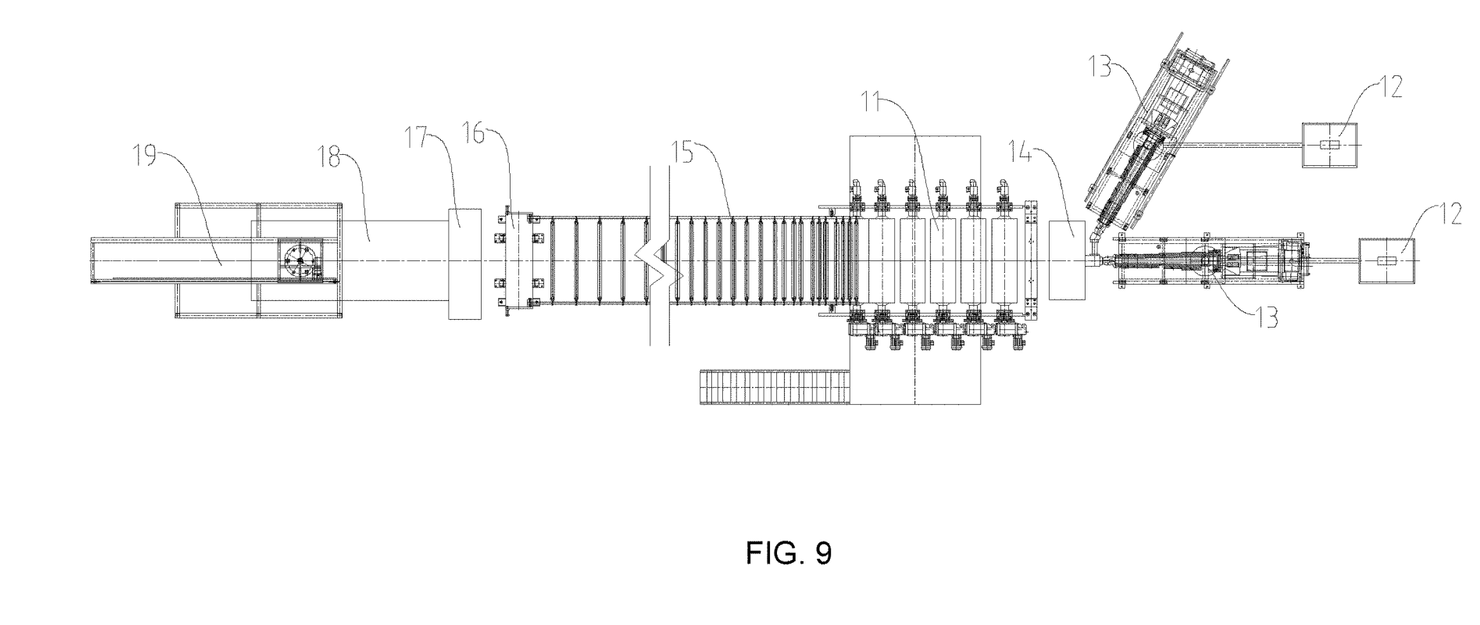

On the basis of the calender described above, a floor production line may be assembled. Referring to FIG. 8 and FIG. 9, in addition to the calender 11, the floor production line further comprises feeders 12, extruders 13 and a mold 14 all arranged at a front end of the calender 11, and a cooling bracket 15, a tractor 16, a cutter 17, a conveying bracket 18 and a plate lifter 19 all successively arranged behind a discharge end of the calender 11. By the floor production line, the full-automatic production including materials mixing, extruding, molding, conveying and cutting can be completed.

With the calender of the present application, the overall height space occupation of the calender can be reduced, the height space occupation of the production line in the factory building can be reduced, and it is convenient to transport the calender in long distance.

Embodiment 6

WPC (wood-plastic composite) foamed floor mainly comprises a foamed layer in the middle and solid layers on two sides of the foamed layer. The WPC foamed floor structure differs from the SPC (stone-plastic composite) foamed floor in that the use amount of calcium powder is reduced and the use amount of PVC is increased correspondingly. Therefore, the WPC foamed floor is lighter in weight. However, the change in the raw material ratio of the WPC foamed floor may directly lead to the change in the foamability of the raw materials. In the prior art, the WPC foamed floor is formed by sticking the foamed layer and the solid layers by adhesives. The production process is complex and is not environmentally friendly. However, if the WPC foamed floor is produced by the existing pressing process, the layers of the obtained WPC foamed floor are not sufficiently pressed, resulting in warpage and high rejection rate.

In this embodiment, on the basis of the calender and the production line provided in the above embodiments, a method for producing WPC foamed floor is provided, specifically comprising the following steps:

before starting processing, the extruders 13 and the mold 14 are heated in advance and the temperature is kept unchanged; and the raw materials are extruded after they are molten from powder. If the production line is started before the temperature reaches a desired value, the extruder screw and the reduction gearbox may be damaged or even discarded. The specific production method comprises the following steps:

(1) Material mixing: The materials are mixed at a high speed in a mixer. The temperature in the mixer is gradually increased during the mixing process. When the temperature of the materials reaches about 115° C., cold materials are fed in the mixer and then mixed again. When the temperature of the materials drops to about 30° C., the mixed materials are put into the bin of the feeder 12 that feeds the materials to the hopper of the extruder 13. Depending on different types of floor, the formulation of the materials differs. By using the production of PVC foamed floor as an example, the materials include PVC powder and accessories. The number of mixers is determined by different floor structures. For example, for general foamed floor, the blank has three layers, including a foamed layer in the middle, an upper solid layer and a lower solid layer. The foamed layer and the solid layers are made of different materials. If the upper solid layer and the lower solid layer are made of a same material, two mixers are needed to respectively mix the materials for the foamed layer and the solid layers.

(2) Extruding: The number of extruders 13 is determined by the number of layers of the blank. In this embodiment, corresponding to the number of mixers, there are two extruders 13, as shown in FIG. 9, configured to extrude the foamed layer and the solid layers, respectively. The extruded material from one extruder is dispensed by a dispenser (the temperature of which is 130-160° C.) into an upper solid layer and a lower solid layer, which are respectively coated on the upper surface and the lower surface of the foamed layer in the middle, which is extruded by the other extruder. After compacting by the mold 14, a blank is formed. The temperature of the side plate of the mold is 170-200° C.

After the blank is formed, films are laminated. The specific film laminating process comprises steps (3)-(5).

(3) First film laminating process: The blank extruded from the mold is subject to a first-stage heating and compacting process, and a first film (embossing film in this embodiment) is laminated on a surface of a side of the blank during the first-stage heating and compacting process. The temperature for the first-stage heating and compacting process is preferably 60-130° C.

(4) Second-stage heating and compacting: At the end of the first film laminating process, the blank is subject to a second-stage heating and compacting process so that the first film is more tightly laminated onto the blank. The heating and compacting process in this step is a heating and compacting between the first film laminating process and the second film laminating process. One heating and compacting process may be performed at a same temperature, or stepwise heating and compacting process may be performed at different temperatures. It is determined by the properties of the blank and the thickness of the first film. The purpose is to ensure that the first film can be more tightly laminated onto the blank. For example, one heating and compacting process is performed at 90-150° C.; or, after the first heating and compacting process at 90-150° C., a second heating and compacting process is further performed at a temperature higher than that for the first heating and compacting process.

(5) Second film laminating process: the blank which has been subject to the heating and compacting process is subjected to a third-stage heating and compacting process, and a second film is laminated onto a surface of the first film during the third-stage heating and compacting process. The temperature for the third-stage heating and compacting process is preferably 120-180° C.

(6) The film-laminated blank is cooled and shaped, and then cut into finished floor products.

For the processing of the foamed floor, the stepwise heating and compacting process is designed. This process facilitates the foaming of the blank. After the first film is laminated, the blank having the first film already laminated thereon is subjected to second-stage heating and compacting process, in order to improve the laminating effect of the first film onto the blank and also plasticize the first film. Then, a second film is laminated. This can improve the laminating effect of the second film onto the first film.

In the above steps, the temperature for the second-stage heating and compacting process is higher than the temperature for the first-stage heating and compacting process, and the temperature for the third-stage heating and compacting process is higher than the temperature for the second-stage heating and compacting process.

The production method further comprises the following preferred steps.

1. Cooling and Shaping

The blank is always in high temperature during the processing and the blank extruded from the mold is still in high temperature, which can reach a maximum of about 200° C. If the high-temperature blank is subject to high-temperature compacting and film laminating processes, waves may occur on the blank. Therefore, after the aforementioned step (2) is performed, the blank extruded from the mold is first cooled and shaped by the front-end cooling device as described in Embodiment 1, and then subject to the first film laminating process described in the step (3).

Since the blank is further subject to the heating and compacting process after being cooled and shaped, in order to obtain better cooling effect, the cooling may be performed in stages. From the extrusion of the blank to the first-stage heating and compacting process, at least a first cooling stage and a second cooling stage are performed. The temperature for the first cooling stage is not higher than that for the second cooling stage. For example:

First cooling method: The blank is cooled in three stages. In the first cooling stage, the blank is cooled by the set of cooling plates 211 at 20-60° C. In the second cooling stage, the blank is cooled by the set of cooling rollers 212 at 20-60° C. In the third cooling stage, the blank is cooled by the set of cooling rollers 212 at 30-80° C. The temperature for the three stages is gradually increased. In this case, the front-end cooling device comprises one set of cooling plates 211 and two set of cooling rollers 212.

Second cooling method: The blank is cooled for shaping in two stages, at an incrementally increased temperature. In the first cooling stage, the blank is cooled by the set of cooling plates 211 at 20-60° C. In the second cooling stage, the blank is cooled by the set of cooling rollers 212 at 30-80° C. In this case, the front-end cooling device comprises one set of cooling plates 211 and one set of cooling rollers 212.

Before the film laminating process, the blank is cooled and shaped. Thus, the blank is cooled and flattened for shaping, before the heating and compacting process. In this way, the blank is prevented from curling during the film laminating process. The process of cooling and shaping is performed in stages. With the progress of the process of cooling and shaping, the temperature is gradually increased. In this way, the blank flattened by and extruded from the mold is quickly shaped at lower temperature, and undergoes a gradual temperature increase process before the high-temperature compacting process. This ensures the shaping of the blank. Especially for the foamed floor, this process facilitates the foaming of the blank.

2. Fourth Heating and Compacting Process

After the step (5), to ensure tighter lamination of the two films onto the blank, the blank having the two films laminated thereon is further subject to a heating and compacting process.

3. Embossing

Depending on the processing requirements of the sheets, both sides or a single side of the blank may be embossed. In this process, during the third-stage heating and compacting process or the fourth-stage heating and compacting process, the surface of a single side or the surfaces of both sides of the blank may be embossed. Correspondingly, the calendering roller is replaced with an embossing roller.

4. Further Film Laminating Process

After the fourth-stage heating and compacting process, depending on the film laminating requirements, a further film laminating process may be performed if another film is to be laminated onto the blank. A third film is laminated onto the second film. After the third film is laminated, the blank is subject to another heating and compacting process.

The processing of the blank machined in the calender in the above production method will be specifically described with reference to FIG. 3.

The blank formed from the mold first enters the set of cooling plates 211 to be cooled and shaped. The blank discharged from the set of cooling plates 211 passes through the two set of cooling rollers 212 to be cooled and shaped, and finally enters the set of calendering rollers 2.

First film laminating process: The blank first enters the calendering roller at the feed end 201, and the printing film 4 is also guided to the calendering roller at the feed end 201 where the printing film 4 is laminated onto the blank in a heating and compacting process. So far, the first-stage heating and compacting process is completed.

Second-stage heating and compacting process: Then, the blank passes through the calendering rollers in an "S" form, and enters the gap between the second calendering roller 202 and the third calendering roller 203 from the gap between the calendering roller at the feed end 201 and the second calendering roller 202. During this process, the heating and compacting process is completed.

Second film laminating process: The wear-resistant film 5 is laminated onto the blank when the blank passes through the third calendering roller 203. So far, the third-stage heating and compacting process is completed.

Fourth heating and compacting stage: The blank having the two films laminated thereon is heated and compacted when it passes through the gap between the third calendering roller 203 and the fourth calendering roller 204. Finally, a complete blank is formed.

The selection of the temperature for the process of cooling and shaping and the temperature for each heating and compacting stage is related to the thickness of both the blank and the film. The selection of temperature in several specific production methods will be given below.

First production process: the foamed floor has a thickness of 5 mm, the printing film has a thickness of 0.1 mm, and the wear-resistant film has a thickness of 0.15 mm; the temperature for the first cooling stage is 20° C., the temperature for the second cooling stage is 20° C., and the temperature for the third cooling stage is 30° C.; the temperature for the first calendering roller 501 is 60° C., the temperature for the second calendering roller 502 is 90° C., the temperature for the third calendering roller 503 is 120° C., and the temperature for the fourth calendering roller 504 is 120° C.

Second production process: the foamed floor has a thickness of 7 mm, the printing film has a thickness of 0.15 mm, and the wear-resistant film has a thickness of 0.3 mm; the temperature for the first cooling stage is 30° C., the temperature for the second cooling stage is 40° C., and the temperature for the third cooling stage is 50° C.; the temperature for the first calendering roller 501 is 90° C., the temperature for the second calendering roller 502 is 110° C., the temperature for the third calendering roller 503 is 140° C., and the temperature for the fourth calendering roller 504 is 140° C.

Third production process: the foamed floor has a thickness of 8 mm, the printing film has a thickness of 0.18 mm, and the wear-resistant film has a thickness of 0.2 mm; the temperature for the first cooling stage is 30° C., the temperature for the second cooling stage is 40° C., and the temperature for the third cooling stage is 50° C.; the temperature for the first calendering roller 501 is 110° C., the temperature for the second calendering roller 502 is 150° C., the temperature for the third calendering roller 503 is 160° C., and the temperature for the fourth calendering roller 504 is 180° C.

Fourth production process: the foamed floor has a thickness of 11 mm, the printing film has a thickness of 0.2 mm, and the wear-resistant film has a thickness of 0.5 mm; the temperature for the first cooling stage is 30° C., the temperature for the second cooling stage is 40° C., and the temperature for the third cooling stage is 50° C.; the temperature for the first calendering roller 501 is 130° C., the temperature for the second calendering roller 502 is 140° C., the temperature for the third calendering roller 503 is 180° C., and the temperature for the fourth calendering roller 504 is 180° C.

Test results show that the above several production processes have good foaming, film-laminating, knurling and embossing effect.

What is claimed is:

1. A calender, comprising a calendering roller rack and a set of calendering rollers arranged on the calendering roller rack, wherein the set of calendering rollers are horizontally arranged relative to each other and no calendering roller is vertically arranged relative to the set of calendering rollers, and the set of calendering rollers comprises a calendering roller at a feed end, a second calendering roller, a third calendering roller and an embossing roller arranged in sequence along a horizontal direction;

the calender further comprises a film laminating assembly and a film laminating assembly rack for mounting the film laminating assembly;

the film laminating assembly comprises a printing film assembly configured to guide a printing film and a wear-resistant film assembly configured to guide a wear-resistant film, the printing film assembly and the wear-resistant film assembly are arranged on an operating platform side by side, and, when in operation, the printing film is guided to the calendering roller at the feed end via a first guide mechanism, and the wear-resistant film is guided to the third calendering roller via a second guide mechanism to laminate the printing film and the wear-resistant film onto a blank;

the first guide mechanism comprises a first preliminary guide wheel arranged on the operating platform; along a feeding path of the printing film, the first guide mechanism further comprises a first extended guide wheel set arranged at a rear end of the first preliminary guide wheel, and the first extended guide wheel set at least comprises one guide wheel; the first guide mechanism further comprises a first flattening roller arranged at a rear end of the first extended guide wheel set; to mount the first extended guide wheel set, a first guide rack arranged to extend toward the set of calendering rollers from the operating platform is further provided;

the second guide mechanism comprises a second preliminary guide wheel arranged on the operating platform; along a feeding path of the wear-resistant film, a second extended guide wheel set and a second flattening roller are arranged at a rear end of the second preliminary guide wheel; and, a second guide rack is further provided, on which the second extended guide wheel set is mounted.

2. The calender according to claim 1, wherein walking wheels are arranged on a bottom of the calendering roller rack to make the calendering roller rack capable of walking on a ground track.

3. The calender according to claim 1, further comprising a front-end cooling device, and the blank enters the feed end of the set of calendering rollers from a discharge end of the front-end cooling device to realize cooling of the blank.

4. The calender according to claim 3, wherein the front-end cooling device comprises at least one set of cooling rollers and/or at least one set of cooling plates; the set of cooling rollers comprises two cooling rollers spaced apart from each other for sandwiching the blank therebetween; and the set of cooling plates comprises two cooling plates spaced apart from each other for sandwiching the blank therebetween.

5. The calender according to claim 4, wherein the set of cooling rollers and/or the set of cooling plates are arranged aligned with the set of calendering rollers along a horizontal direction of the ground.

6. The calender according to claim 1, wherein a bearing seat mounting rail is arranged on the calendering roller rack, and the bearing seat mounting rail is directed from a calendering roller at a discharge end of the set of calendering rollers towards an adjacent calendering roller to the calendering roller at the discharge end; the calendering roller at the discharge end is mounted on the bearing seat mounting rail by a bearing seat in order to adjust a distance between the calendering roller at the discharge end and the adjacent calendering roller.

7. The calender according to claim 1, wherein the calendering roller rack and the film laminating assembly rack are arranged in relative motion to each other, and the calendering roller rack is capable of moving relatively to the ground.

8. The calender according to claim 7, wherein walking wheels are arranged on a bottom of the calendering roller rack to make the calendering roller rack capable of walking on a ground track.

9. The calender according to claim 7, wherein the film laminating assembly rack is fixedly mounted on the ground.

10. A floor production line comprising the calender according to claim 1.

11. A method for producing a floor by the calender according to claim 1: mixing materials and melting, and then extruding a blank, performing film laminating process to the extruded blank and then cooling and cutting; wherein the film laminating process comprises the following steps:

(1) performing a first-stage heating and compacting process to the blank, and laminating a first film onto a surface of a side of the extruded blank during the first-stage heating and compacting process;

(2) performing at least one second-stage heating and compacting process to the blank after processed by the first-stage heating and compacting process; and (3) performing a third-stage heating and compacting process to the blank after processed by the second-stage heating and compacting process, and laminating a second film onto a surface of the first film during the third-stage heating and compacting process.

12. The method according to claim 11, wherein a temperature for the second-stage heating and compacting process is higher than a temperature for the first-stage heating and compacting process, and a temperature for the third-stage heating and compacting process is higher than a temperature for the second-stage heating and compacting process.

13. The method according to claim 12, wherein the temperature for the first-stage heating and compacting process is 60° C. to 130° C., the temperature for the second-stage heating and compacting process is 90° C. to 150° C., and the temperature for the third-stage heating and compacting process is 120° C. to 180° C.

14. The method according to claim 11, wherein cooling and shaping the blank before the film laminating process; the cooling and shaping process is staged cooling and shaping and comprises at least a first cooling stage and a second cooling stage after the blank is extruded and before the first-stage heating and compacting process.

15. The method according to claim 14, wherein a temperature for the first cooling stage is not higher than a temperature for the second cooling stage.

16. The method according to claim 15, wherein the temperature for the first cooling stage is 20° C. to 60° C., and the temperature for the second cooling stage is 30° C. to 80° C.

* * * * *